US006721953B1

(12) United States Patent
Bates et al.

(10) Patent No.: US 6,721,953 B1
(45) Date of Patent: Apr. 13, 2004

(54) DISPLAY OF TELEVISION PROGRAM INFORMATION USING DYNAMICALLY-ADJUSTED SCROLL RATE

(75) Inventors: Cary Lee Bates, Rochester, MN (US); Paul Reuben Day, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/502,394

(22) Filed: Feb. 11, 2000

(51) Int. Cl.[7] .............................. G06F 3/00; G09G 5/34
(52) U.S. Cl. .......................... 725/39; 725/46; 725/52; 345/784; 345/785; 345/786
(58) Field of Search ..................... 725/52, 37; 345/745, 345/784, 786, 785, 765, 721, 720

(56) References Cited

U.S. PATENT DOCUMENTS

| | | | | |
|---|---|---|---|---|
| 4,952,927 A | * | 8/1990 | DeLuca et al. | 340/7.55 |
| 5,353,121 A | * | 10/1994 | Young et al. | 725/52 |
| 5,495,566 A | * | 2/1996 | Kwatinetz | 345/785 |
| 5,579,055 A | * | 11/1996 | Hamilton et al. | 725/49 |
| 5,635,989 A | * | 6/1997 | Rothmuller | 725/46 |
| 5,682,563 A | * | 10/1997 | Shinohara et al. | 396/287 |
| 5,774,109 A | * | 6/1998 | Winksy et al. | 345/685 |
| 5,892,498 A | * | 4/1999 | Maeshall et al. | 345/123 |
| 5,936,618 A | * | 8/1999 | Spiero et al. | 345/204 |
| 6,020,883 A | * | 2/2000 | Herz et al. | 345/721 |
| 6,034,688 A | * | 3/2000 | Greenwood et al. | 345/784 |
| 6,154,757 A | * | 11/2000 | Krause et al. | 715/530 |
| 6,243,145 B1 | * | 6/2001 | Schlarb et al. | 725/39 |
| 6,323,911 B1 | * | 11/2001 | Schein et al. | 348/552 |
| 6,351,273 B1 | * | 2/2002 | Lemelson et al. | 345/786 |
| 6,425,129 B1 | * | 7/2002 | Sciammarella et al. | 725/38 |
| 6,426,779 B1 | * | 7/2002 | Noguchi et al. | 348/569 |
| 6,452,612 B1 | * | 9/2002 | Holtz et al. | 345/723 |
| 6,462,752 B1 | * | 10/2002 | Ma et al. | 345/684 |
| 6,536,041 B1 | * | 3/2003 | Knudson et al. | 725/39 |
| 6,542,169 B1 | * | 4/2003 | Marshall et al. | 345/781 |
| 6,571,390 B1 | * | 5/2003 | Dunn et al. | 725/52 |
| 6,571,930 B2 | * | 6/2003 | Li et al. | 194/232 |

\* cited by examiner

Primary Examiner—John Miller
Assistant Examiner—Annan Q. Shang
(74) Attorney, Agent, or Firm—Wood, Herron & Evans, LLP

(57) ABSTRACT

An apparatus, program product and method dynamically adjust the scroll rate used to scroll through the program information for various television programs available to a television viewer to provide a variable rate of scroll for program information presented to the television viewer. The scroll rate may be varied, for example, to emphasize certain program information relative to other program information, e.g., by slowing down the scroll rate to increase the visibility for important program information and speeding up the scroll rate to decrease the visibility of less important program information. Dynamic scroll rate adjustment may be utilized in a number of situations, including in connection with non-interactive electronic program listings, interactive electronic program guides, and electronic overlays, among others. Furthermore, dynamic scroll rate adjustment may be based upon a number of different characteristics of the television programs associated with the displayed program information, including for example, the frequency of access of different television programs, or sponsorship of certain television programs.

27 Claims, 7 Drawing Sheets

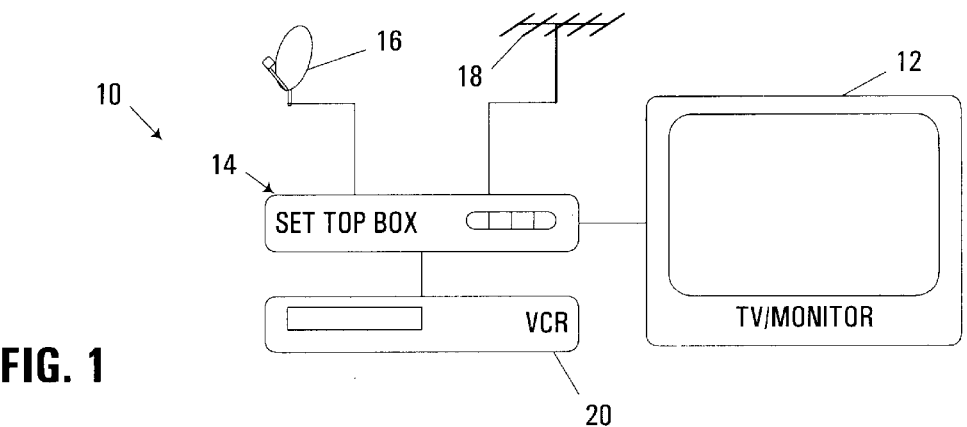
FIG. 1
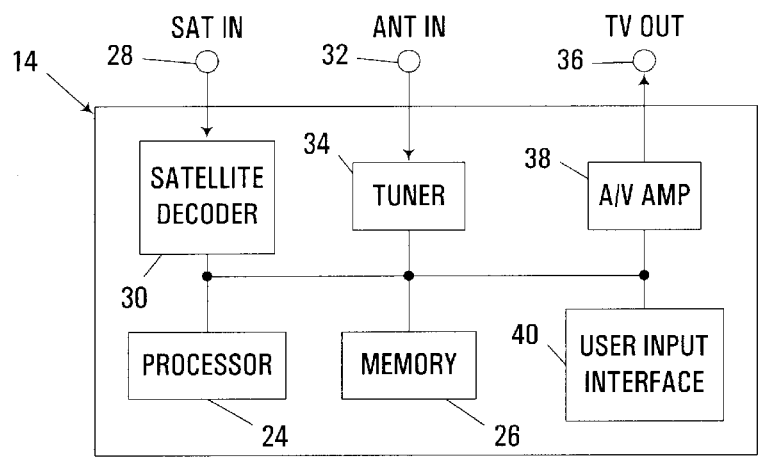
FIG. 2
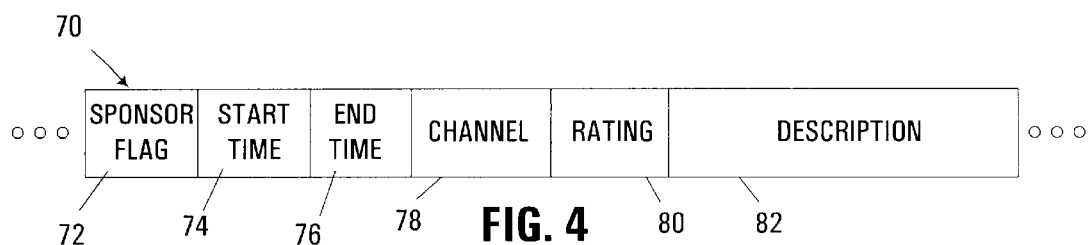
FIG. 3
FIG. 4

DISPLAY OF TELEVISION PROGRAM INFORMATION USING DYNAMICALLY-ADJUSTED SCROLL RATE

FIELD OF THE INVENTION

The invention is generally related to the display of television program information, and in particular, to scrolling the display of television program information, e.g., in a continuous manner or responsive to user input.

BACKGROUND OF THE INVENTION

As the number of available sources of television programming increases, it becomes more and more difficult for television viewers to locate interesting television programs. In the earlier days of television, a television viewer was limited to watching television programs on only a few television channels, such as those of the local affiliates of national broadcast networks such as ABC, CBS and NBC. With such a limited number of programming sources, viewers were able to simply "surf" between channels to locate interesting programs.

Due to the advent of cable and satellite television services, however, the number of channels available to television viewers has risen dramatically, to the point where some viewers may have access to as many as several hundred channels. With so many available channels, however, surfing is often not a particularly efficient way to locate interesting television programs. Many users therefore rely on electronic program information to determine what television programs are available for viewing.

For example, many cable providers display non-interactive program listings on a preview channel, with the program listings sorted first by timeslot (e.g., by starting time), and then by channel number. The program listings are arranged in a list and displayed on a television screen. However, due to the limited real estate available on a television screen, only a portion of the list can be displayed at any given time. Accordingly, the list is typically scrolled through on the screen at a slow enough rate so that viewers can read the displayed program listings before the individual listings are scrolled off of the screen.

One problem with such broadcast program listings is that the time required to scroll through the program listings for all of the possible channels can be significant, and many viewers can become frustrated waiting for the list to scroll to channels that the viewers are particularly interested in. Furthermore, since all available channels are displayed in the listings, viewers are often required to view a large number of program listings for channels that they probably never watch. Also, given that the listings are typically generated by the cable provider and broadcast to all customers, individual viewers have no manner of customizing the listings to highlight their favorite channels.

Electronic program information is also used in interactive electronic program guides supported by the television receiving devices (e.g., set top boxes and satellite receivers) available from many cable and satellite providers. Rather than scrolling continuously through program listings, electronic program guides typically display a list of television programs, either in a one-dimensional array sorted by channel and/or timeslot, or in a two-dimensional array or grid where programs are arranged by channel in one dimension and by timeslot in the other dimension. A user-manipulated cursor is also displayed to permit a user to move from program to program and perform different activities, e.g., viewing a program or obtaining more detailed program information about a program. Moreover, viewers are often capable of storing lists of favorite channels, so that only the program information for the programs on those favorite channels are listed in the electronic program guide.

Like non-interactive electronic program listings, electronic program guides are typically not capable of displaying the program information for all of the available channels simultaneously. As such, a viewer is typically permitted to scroll through the program information interactively, with the display updated as necessary based upon the movement of the cursor.

Some television receiving devices also support on-screen overlays that display more detailed program information about a current program being watched by a viewer. Through the use of cursor control keys, a viewer may be permitted to scroll sequentially to different channels or timeslots to view program information for other television programs, and then perform operations such as selecting a program or viewing additional information about the program.

While interactive electronic program guides and overlays typically provide faster and more efficient access of program information than non-interactive electronic program listings, a viewer can still spend a significant amount of time scrolling through program information to locate interesting television programs. Especially when a viewer has not created a favorite channel list, the viewer may be required to scroll past the program information for numerous programs that the viewer would have absolutely no interest in watching.

Every viewer inherently will have different interests, as well as different likes and dislikes, and as such will typically favor certain types of programs over others. However, conventional manners of presenting program information to viewers have only limited capabilities for assisting viewers in accessing the program information that those viewers will find the most interesting. Therefore, a significant need continues to exist in the art for a manner of facilitating fast and efficient viewer access to interesting television program information.

SUMMARY OF THE INVENTION

The invention addresses these and other problems associated with the prior art by providing an apparatus, program product and method in which the scroll rate used to scroll through the program information for various television programs available to a television viewer is dynamically adjusted to provide a variable rate of scroll for program information presented to the television viewer. Among other possible implementations, such a configuration permits a scroll rate to be adjusted to emphasize certain program information relative to other program information, e.g., by slowing down the scroll rate to increase the visibility for important program information and speeding up the scroll rate to decrease the visibility of less important program information.

Dynamic scroll rate adjustment may be implemented, for example, by displaying program information for a first television program from a plurality of television programs on a display, scrolling the display to display program information for a second television program from the plurality of television programs, and dynamically adjusting a scroll rate at which the display is scrolled based upon a predetermined characteristic of the first television program.

Dynamic scroll rate adjustment may also be utilized in a number of situations in which program information is presented to a viewer. As one example, for a non-interactive electronic program listing that displays a continuously scrolling list of program information, dynamic adjustment of scroll rate may be used to vary the rate at which program information is scrolled across a television screen. As another example, for an interactive electronic program guide, dynamic adjustment of scroll rate may be used to vary the movement of a user-manipulated cursor and/or the incremental scrolling of the display that occurs as a user attempts to move a cursor outside of currently-displayed program listings. As still another example, for an electronic overlay, dynamic adjustment of scroll rate may be used to vary the rate at which program information for one television program is replaced with program information for another television program. Other situations suitable for the use of dynamic scroll rate adjustment will be apparent to one of ordinary skill in the art having the benefit of the instant disclosure.

Dynamic scroll rate adjustment may also be based upon a number of different characteristics of the television programs associated with the displayed program information. For example, dynamic scroll rate adjustment may be based upon the frequency of access of different television programs, determined, e.g., based upon the monitored viewing habits of a television viewer or user. In such an implementation, the scroll rate may be decreased as a user views program information for a frequently watched program, and increased as a user views program information for programs that are rarely if ever watched. Dynamic scroll rate adjustment may also be based upon sponsorship of certain television programs, e.g., to permit a program provider to pay for a slower scroll rate, and thus, greater visibility to viewers. Other characteristics will be apparent to one of ordinary skill in the art having the benefit of the instant disclosure.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 1 is a block diagram of a television system incorporating dynamic scroll rate adjustment consistent with the invention.

FIG. 2 is a block diagram of the set top box from the system of FIG. 1.

FIG. 3 is a block diagram of a favorite programs table data structure utilized by the set top box of FIG. 2.

FIG. 4 is a block diagram of a stream of download program information data transmitted to the set top box of FIG. 2.

DETAILED DESCRIPTION

Figure 5:
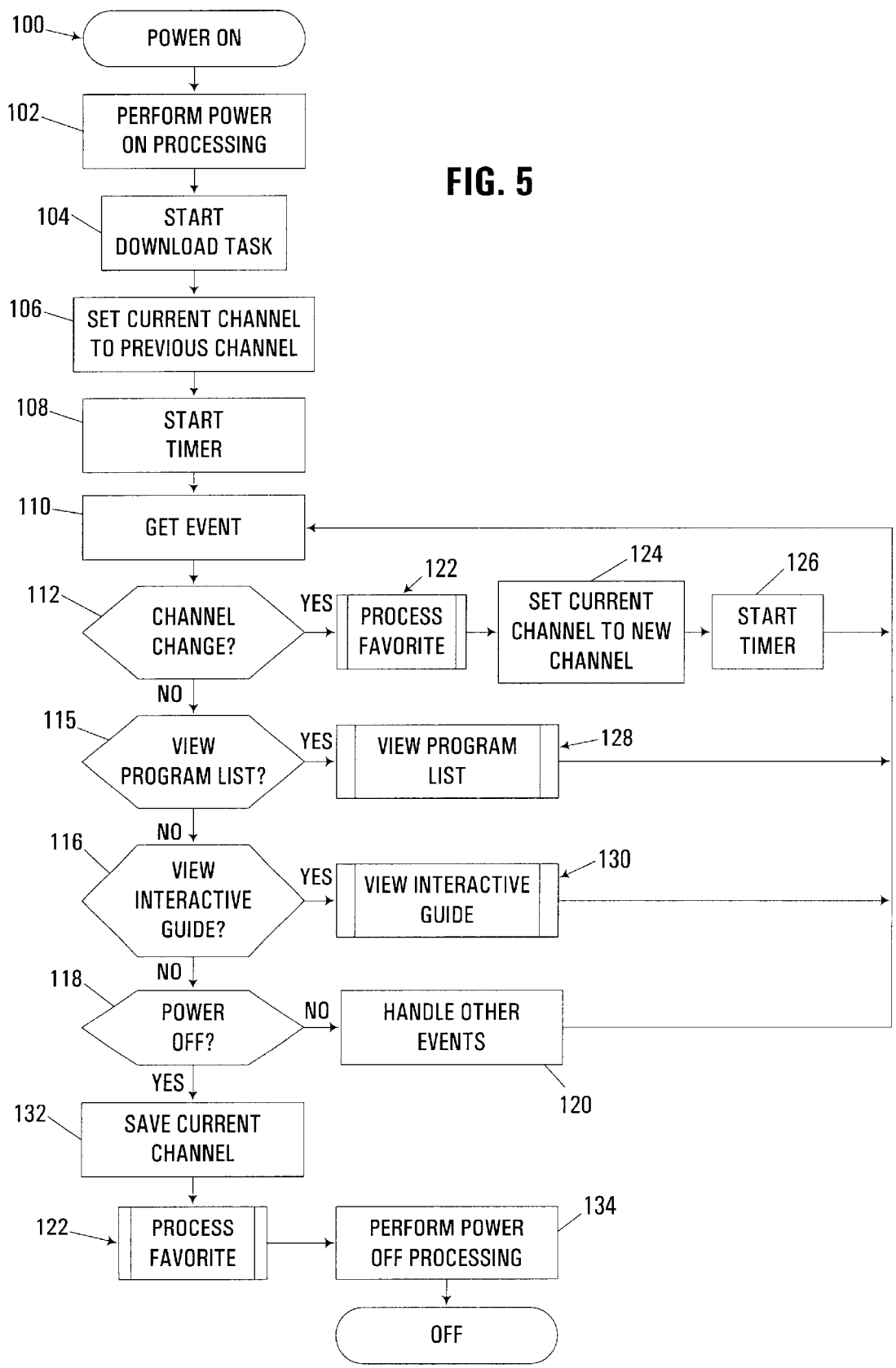
FIG. 5 is a flowchart illustrating the program flow of a main routine executed by the set top box of FIG. 2.

Turning to the Drawings, wherein like numbers denote like parts throughout the several views, FIG. 1 illustrates a television system 10 incorporating dynamic scroll rate adjustment consistent with the invention. System 10 includes a television or monitor 12 coupled to a set top box 14 to receive audio and video signals therefrom. Set top box 14 in the illustrated implementation is a satellite receiver capable of receiving satellite television broadcast signals via a direct broadcast satellite (DBS) dish 16, as well as off-air television broadcast signals via an antenna 18 (or alternately, a cable provider).

Also illustrated in system 10 is a video cassette recorder (VCR) 20, coupled to receive input from set top box 14, as well as any additional sources, e.g., off-air or cable television broadcast signals (not shown separately). VCR 20 may also be capable of optionally outputting audio and video signals directly to television/monitor 12, rather than passing such signals through set top box 14.

Dynamic scroll rate adjustment is implemented in the illustrated implementation within set top box 14. However, it will be appreciated by those of ordinary skill in the art having benefit of the instant disclosure that such functionality may be implemented in any number of devices capable of displaying program information to a viewer, including, for example, televisions, cable set top boxes, personal video recorders, computers, VCR's, etc. Further, set top box 14 need not necessarily be capable of directly receiving and/or displaying television programs to viewers, so long as the box is capable of monitoring a user's viewing habits and displaying program information to the user. In addition, television programs may be received from any number of sources, including off-air broadcast sources, cable television sources, satellite television sources, and computer network sources such as the Internet.

Now turning to FIG. 2, set top box 14 is illustrated in greater detail. Set top box 14 is under the control of a processor 24, which is interfaced with a memory 26 storing both program code suitable for execution by the processor, as well as additional data structures required by the processor in controlling the operation of the set top box. Processor 24 may represent one or more processors (e.g., microprocessors or microcontrollers), and memory 26 may represent the random access memory (RAM) devices comprising the main storage of the set top box, as well as any supplemental levels of memory, e.g., cache memories, non-volatile or backup memories (e.g., programmable or flash memories), read-only memories, etc. In addition, memory 26 may be considered to include memory storage physically located elsewhere in set top box 14, e.g., any cache memory in processor 24, as well as any storage capacity used as a virtual memory, e.g., as stored on a mass storage device or on another data processing system coupled to set top box 14 via an external network (not shown).

Satellite television broadcast signals are received by set top box 14 through a satellite input 28 and decoded by a satellite signal decoder 30. Likewise, off-air or cable television signals are received through an antenna input 32 and processed by a tuner 34. Audio and/or video data output by either of decoder 30 and tuner 34 are output to a television or video monitor through a TV output 36 driven by audio/video amplification circuitry 38. Furthermore, user input is received from a viewer via interface 40, e.g., to receive input via front panel buttons and/or a remote control.

Set top box 14 operates under the control of an embedded operating system, and executes or otherwise relies upon various software and/or firmware applications, components, programs, objects, modules, data structures, etc. In general, the routines executed to implement the embodiments of the invention, whether implemented as part of an operating system or a specific application, component, program, object, module or sequence of instructions, will be referred to herein as "computer programs", or simply "programs". The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and other programmable electronic devices, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary environment illustrated in FIGS. 1 and 2 is not intended to limit the present invention. Indeed, those skilled in the art will recognize that other alternative hardware and/or software environments, including implementations partly or wholly in hardwired logic, may be used without departing from the scope of the invention.

In the embodiment illustrated hereinafter, dynamic scroll rate adjustment is utilized in connection with the generation of a favorites list based upon user viewer habits. Put another way, the programs watched by a viewer are tracked to identify subsets of the available programs that have a frequency of access above a certain threshold, with the scroll rates for each of the programs in the favorite programs list set according to the relative frequencies of access therefor.

Dynamic scroll rate adjustment in the illustrated embodiment relies on a number of data structures, e.g., a favorite programs table data structure 50 illustrated in FIG. 3. Table 50 includes a plurality of entries or records 52, each indexed by a combination of a channel identifier 54, a day identifier 56 and a time slot identifier 58. In addition, each entry includes a watched count field 60 that identifies a number of times that a particular program, identified by channel, day and time slot, has been watched greater than a threshold period of time. In addition, each entry 52 includes a scroll rate field 62 that stores a stored scroll rate to associate with the program.

It will be appreciated that alternate data structures may be utilized to store the information in table 50. Moreover, alternate manners of identifying unique programs, e.g., program identifiers, may be used in the alternative as an index into table 50. Furthermore, other manners of tracking the relative frequencies of access for different programs may be used, e.g., accumulating total viewing times, etc. Furthermore, it may be desirable to monitor viewings of the same program at different times, on different channels and/or, if a program is an episode of a recurring series, other episodes of the same series, such that counts for multiple related programs are incremented collectively in response to viewing of one of the related programs. As an example, if a user frequently watches a syndicated sitcom that is shown at multiple times in the day, or on different channels, all of the related showings of the program may be emphasized in the favorite program table data.

As will become more apparent below, dynamic scroll rate adjustment may be used in a number of different environments, including in connection with non-interactive program listings and interactive program guides. For either environment, set top box 14 must be capable of receiving electronic program information identifying programs accessible by the set top box. As shown in FIG. 4, for example, electronic program information may be provided by means of a data stream of download data structures, e.g., a stream of records 70, each including a number of fields 72–82.

Field 72 includes a sponsor flag, which indicates whether or not a given program is sponsored. Typically, sponsorship is determined based on whether an advertising fee has been paid on behalf of a program to emphasize the program information therefor on any lists displayed to a viewer (similar to paying a greater fee to have a yellow pages listing printed in bold type). For example, the producer of a particular program may wish to pay a broadcaster an advertising fee in exchange for a slower scroll rate, thereby emphasizing the program relative to other programs displayed to the viewer.

Each download data record 70 also includes start time and end time fields 74, 76 identifying a time slot with which the record is associated. A channel field 78 stores a channel associated with the program information, and field 80 stores optional rating information that may also be used in some implementations as a characteristic of programs to be used in dynamically adjusting the scroll rate, e.g., to scroll quickly past programs that exceed a predetermined rating threshold. Field 82 includes the description information for a program, including, for example, the program title. Other information may be provided in the downloaded data consistent with the invention.

FIG. 5 illustrates the sequence of operations that occur in a main routine 100 initiated in response to powering on of set top box 14. Routine 100 begins in block 102 by performing routine power on processing. Next, block 104 starts a download task, which operates as a separate thread to periodically download program information broadcast to the set top box, and process the information to construct and sort the program information based on user viewing habits in a manner consistent with the invention. Next, block 106 sets a current channel variable to the previous channel viewed as of the last time the set top box was powered off. In addition, block 108 starts a timer that is utilized to determine the duration during which the now current channel is viewed by a viewer.

Next, block 110 initiates an event-driven loop that processes various user input and other events as appropriate for the functionality of set top box 14. A number of events relevant to dynamic scroll rate adjustment are detected in blocks 112–118. Other events, which are not specifically relevant to dynamic scroll rate adjustment, are handled in a conventional manner in block 120. It will be appreciated that other program models may also be utilized in routine 100 consistent with the invention.

One event that may be handled by routine 100 is that of a channel change, which is detected in block 112 and handled by passing control to a process favorite routine 122. A channel change may be responsive to up or down buttons, direct channel input or selection of a program from a guide or overlay, etc. As will be discussed in greater detail below, process favorite routine 122 determines whether, as of the channel change event, the previous channel has been viewed for a time period in excess of a threshold, with the favorite program table updated as necessary. Upon completion of routine 122, control passes to block 124 to set the current channel to the new channel specified in the channel change event, and to block 126 to restart the timer to monitor the duration that the new channel is viewed. Control then returns to block 110 to process additional events.

Another event handled by routine 100 is a view program list event, which is detected in block 114 and handled by calling a view program list routine 128 to display a non-interactive electronic program list. Likewise, to provide greater interactivity, block 116 detects a view interactive guide event, and processes the event by calling a view interactive guide routine 130. Each of the events detected in blocks 114 and 116 may be initiated, for example, by depressing a specific button on a remote control or selecting a specific function in a menu-driven user interface associated with the set top box. Other manners of initiating the display of interactive or non-interactive program information may used in the alternative.

Another event that may be handled by routine 100 is a power off event, which is detected in block 118 and handled by passing control to block 132 to save the current channel for retrieval the next time the unit is powered on. The power off event may be generated, for example, by depression of a specific button on the front panel of set top box 14 or on a remote control therefor. Upon completion of block 132, process favorite routine 122 is called, and additional power off processing, known in the art, is performed in block 134. Routine 100 is then complete.

Figure 6:
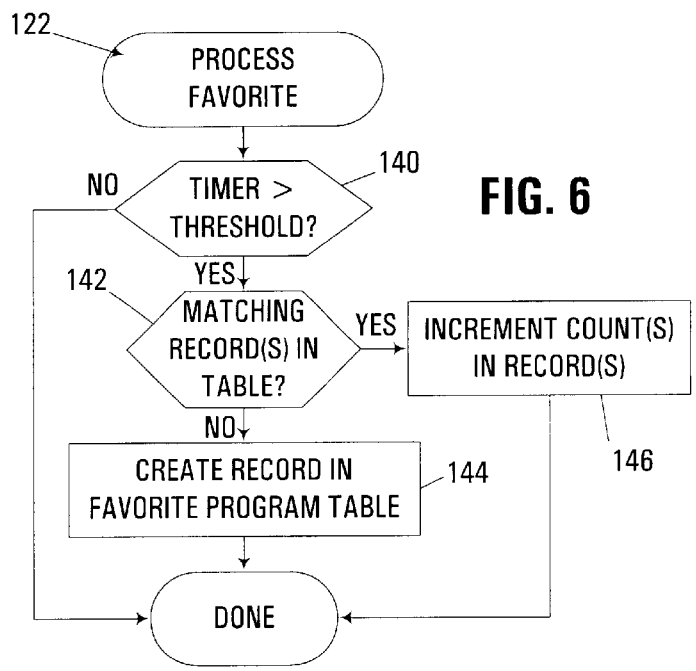
FIG. 6 is a flowchart illustrating the program flow of the process favorite routine referenced in FIG. 5.

FIG. 6 illustrates process favorite routine 122 in greater detail, which begins in block 140 by determining whether the current value stored in the timer exceeds a predetermined threshold. As such, it is determined whether, either due to a channel change or the powering off of the set top box, the channel being viewed prior to the event was viewed for a sufficient period of time to signify a program suitable for designation as a "favorite" program. As such, the threshold may be set at different levels to increase or decrease the length of time that a user has to view a program before it is automatically determined to be a favorite of the user.

First assuming that the timer has not exceeded the threshold, block 140 simply terminates routine 122 without further processing. If, however, the timer exceeds the threshold, control passes to block 142 to determine whether one or more records already exist in the favorite program table matching the current program information for the program currently being viewed (e.g., the channel, time slot and day). If no records currently exist, control passes to block 144 to create a new record in the favorite program table, storing the relevant program identification information in fields 54–58, and storing an initial watched count of "1" in field 60. In addition, no scroll rate is initially stored in field 62 of the new entry. Upon completion of the creation of a new record, routine 122 is complete.

Returning to block 142, if any matching records are found in the table, control passes to block 146 to simply increment the count(s) stored in the record(s), thereby signifying that the favorite program has been viewed an additional time in excess of the predetermined threshold. As mentioned above, other criteria (e.g., accumulated viewing time) may also be used to determine relative frequencies of access for different programs. Moreover, in some embodiments, table 50 may be kept at a fixed maximum size, with programs having the lowest counts periodically deleted as new favorite programs are found. Other manners of "aging" the data, e.g., periodically decrementing the counts for older entries, may also be used to emphasize programs that have been watched more recently than others.

Figure 7:
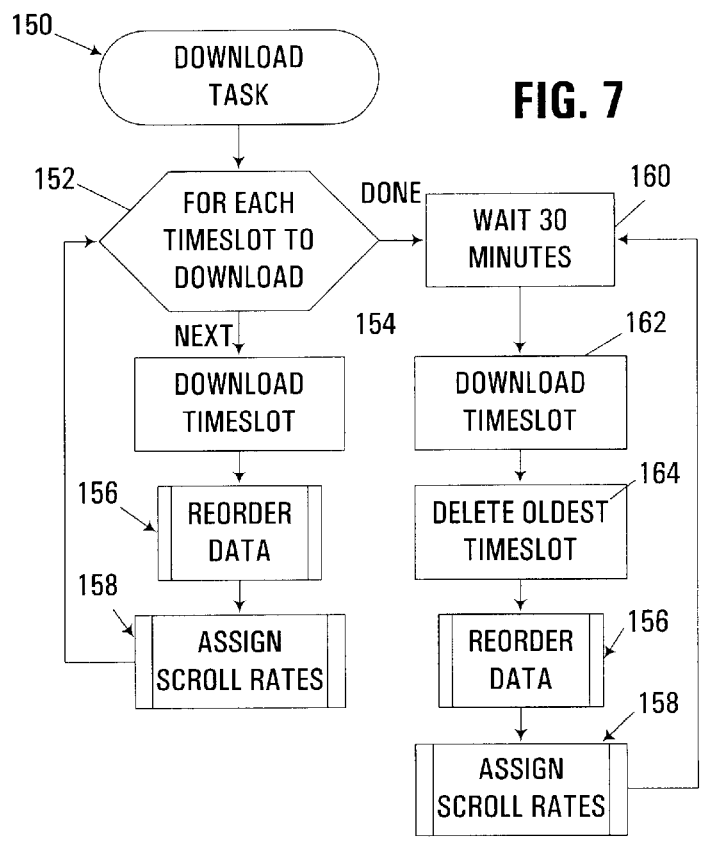
FIG. 7 is a flowchart illustrating the program flow of the download task referenced in FIG. 5.

FIG. 7 next illustrates download task 150 in greater detail. The download task essentially retrieves download data from a source of electronic program information, e.g., a satellite broadcast, a cable broadcast, the Internet or dial up connection, etc. The download task retrieves program information for each time slot in a given range of time slots, and on each thirty minute interval, retrieves additional data for the new time slot in the future.

Task 150 begins in block 152 by initiating a FOR loop processing each time slot to download, e.g., twenty-four hours of program information. For each such time slot, control passes to block 154 to download the program information for that time slot. Next, a reorder data routine 156 is called to order the downloaded data based upon the current favorite programs. Next, an assign scroll rates routine 158 is called to process the ordered data to determine appropriate scroll rates for use in dynamic scroll rate adjustment consistent with the invention. Control then returns to block 152 to process additional time slots. Once all time slots have been processed, block 152 passes control to block 160 to wait for thirty minutes, until the start of the next time slot. After this delay, control passes to block 162 to download the data for the new time slot, and then to block 164 to delete the oldest time slot that has since been rendered moot by the passage of time. Reorder data routine 156 is next called, followed by assign scroll rates routine 158 to ensure that the favorite program data for the time slot is ordered based upon frequency of access, with appropriate scroll rates stored for each such record. Upon completion of routine 158, control returns to block 160 to wait for the next time slot to process additional download data.

Figure 8:
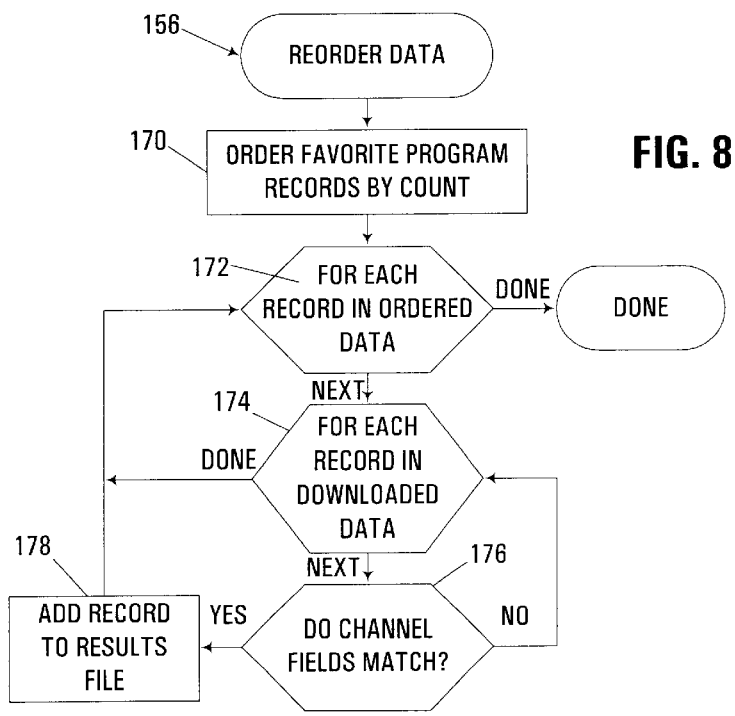
FIG. 8 is a flowchart illustrating the program flow of the reorder data routine referenced in FIG. 7.

FIG. 8 next illustrates reorder data routine 156 in greater detail. Routine 156 begins in block 170 by ordering the favorite program records in table 50 based upon count, thereby determining which programs have been viewed more time than others. It will be appreciated that either the actual table 50 may be reorganized, or in the alternative, a new data structure may be generated including copies of the records in block 50 reordered based upon count.

Next, block 172 initiates a FOR loop to process each record in the ordered favorite program data. Then, block 172 initiates a nested FOR loop to process, for each such ordered data record, each record in the downloaded data.

For each record in the downloaded data, and each record in the ordered data, control passes to block 176 to determine whether the respective channel fields in the ordered data record and the downloaded data record match. If not, control passes to block 174 to process additional records in the downloaded data. If, however, the channel fields do match, control passes to block 178 to add the downloaded data record to a results file, serving as a temporary storage for program information. It will be appreciated that each record in the results file may be organized in a similar manner to the records within table 50. In the alternative, other data structures may be used.

As such, it will be appreciated that reorder data routine 156 attempts to pull from the downloaded data the program information associated with each favorite program stored in table 50, with such downloaded data organized by frequency of access. Once all such records in the ordered data have been processed, routine 156 is complete.

Figure 9:
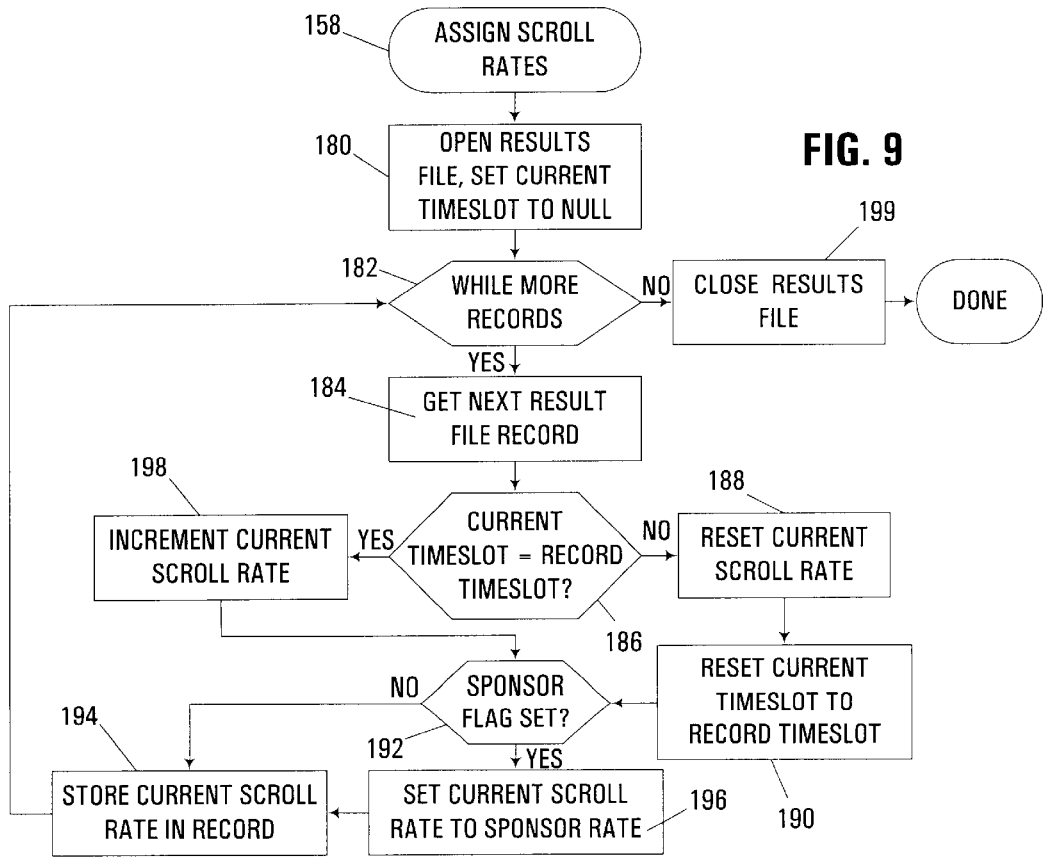
FIG. 9 is a flowchart illustrating the program flow of the assign scroll rates routine referenced in FIG. 7.

FIG. 9 illustrates assign scroll rates routine 158 in greater detail, which begins in block 180 by opening the results file generated by the reorder data routine, and setting a current time slot variable to a null value. Next, block 182 initiates a loop to process each record in the results file. While more unprocessed records exist, block 182 passes to block 184 to get the next results file record. Next, block 186 determines whether the current time slot variable equals the time slot stored in the results file record (typically if the starting times match). Assuming that during the first pass of routine 158 the decision in block 186 will fail (due to the null value stored in the current time slot variable at block 180), control passes to block 188 to reset the current scroll rate to a nominal, or standard, rate. Control then passes to block 190 to reset the current time slot variable to equal that of the time slot for the current results file record. Control then passes to block 192 to determine whether the sponsor flag is set in the results file record. If not, control passes to block 194 to store the current scroll rate determined for that record in the scroll rate field therefor. Control then returns to block 182 to process additional records in the results file.

Returning to block 192, if the sponsor flag is set, the current scroll rate is set to a special sponsor rate, which may be, for example, one-half the nominal rate so that additional exposure for the program provider is permitted in response to the payment of an appropriate sponsorship fee.

Upon completion of block 196, control passes to block 194 to save the current scroll rate in the results file record, and control passes to block 182 to process additional records.

Returning to block 186, if the current time slot does equal the time slot (or specifically the start time) in the results file record, control passes to block 198 to increment the current scroll rate by a predetermined amount. In the alternative, the current scroll rate may be set to a predetermined value in some implementations. Control then passes to block 192 to determine whether the sponsor flag is set.

Also, returning to block 182, once all records in the results file have been processed, control passes to block 199 to close the results file. Routine 158 is then complete.

Therefore, it may be seen that, through the operation of routines 156 and 158, the favorite program data stored in the results file will be initially sorted based upon time slot, and then by relative frequency of access within each time slot. Then, upon execution of block 158, the current scroll rate is reset to a nominal value, and as additional favorite programs are located having the same time slot (or starting time), the scroll rate will increment progressively for each subsequent program listing for the current time slot. Furthermore, given that each record within the results file for a given time slot is respectively ordered based upon frequency of access, the incremental addition to the current scroll rate for subsequent records associated with the time slot ensures that each additional program at the same time slot (which has a lower frequency of access than its preceding program) will be scrolled at a faster and faster rate.

Figure 10:
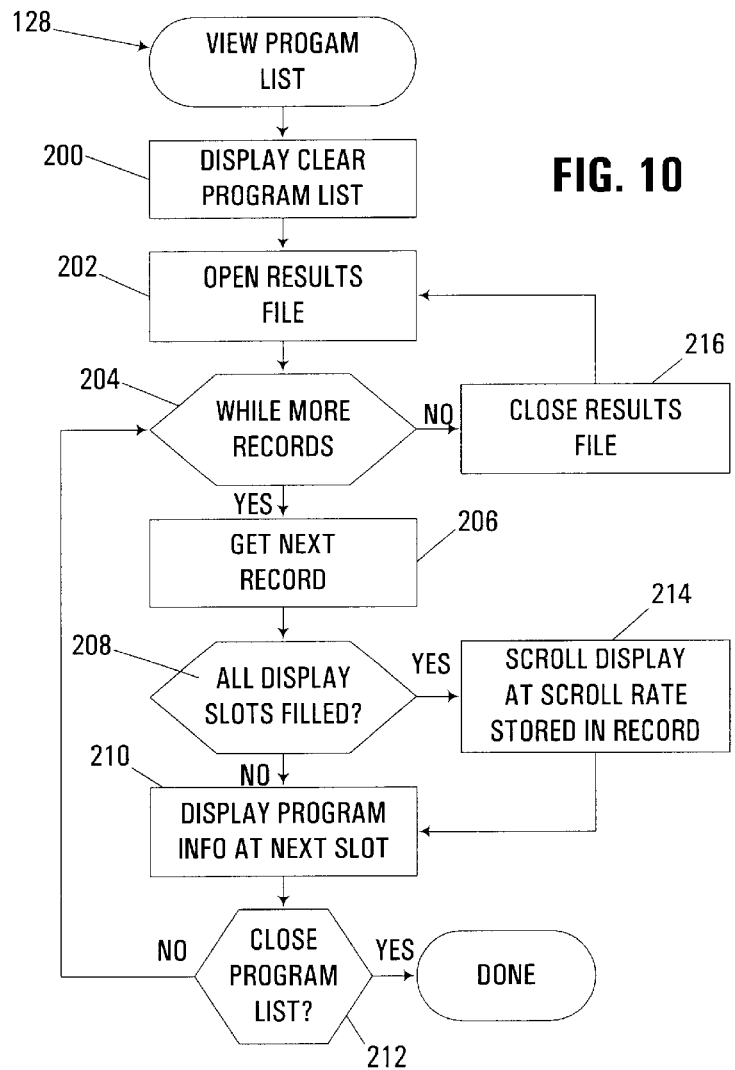
FIG. 10 is a flowchart illustrating the program flow of the view program list routine referenced in FIG. 5.

As discussed above, the information generated by the download task may be utilized in either or both of non-interactive and interactive program displays. The display of a non-interactive electronic program list is illustrated by routine 128 of FIG. 10. Routine 128 begins in block 200 by displaying a clear program list, typically including a plurality of display slots that may be displayed on a screen at a given time. In addition, template information, such as the placement of icons, heading information, boundary lines and other graphics, etc., may also be displayed at this time.

Control then passes to block 202 to open the results file, whereby control then passes to block 204 to initiate a WHILE loop to process each record sequentially in the results file. For each such record, control passes to block 206 to get the next record, and then to block 208 to determine whether all display slots available in the program list are filled. If, for example, all display slots are not already filled, control passes to block 210 to display the program information for the current record in the next available slot. Control then passes to block 212 to detect a close program list event, which is generated, for example, in response to user request to no longer display the program list. If no such event is received, control returns to block 204 to process all of the additional records in the results file. As such, the available display slots in a program list will be quickly filled with the contents of the results file.

Returning to block 208, if all display slots are already filled, control passes to block 214 to scroll the display at the scroll rate stored in the current record, thereby freeing a new display slot in the program list. Control then passes to block 210 to display the new program information in the now available slot.

It will be appreciated that block 214 may include the deletion of information from the oldest slot, and may include either continuous or intermittent scrolling. An example of intermittent scrolling would be to set a delay counter according to the scroll rate, thereby preventing scrolling from one program slot to another until the delay counter has expired. In the alternative, the display may be scrolled at a continuous rate, whereby the scroll rate is utilized to determine the rate at which individual lines of pixels in the display are scrolled. It will be appreciated that the scroll rate may be stored in any number of units, and may be stored as a delay value in some implementations. Other modifications will be apparent to one of ordinary skill in the art.

Returning to block 204, once all records in the results file have been processed, control passes to block 216 to close the results file, and then to block 202 to reopen the results file and retrieve the first record therefrom, thereby permitting the scroll display to wrap around to begin displaying the first record once the last record has been displayed.

Figure 11:
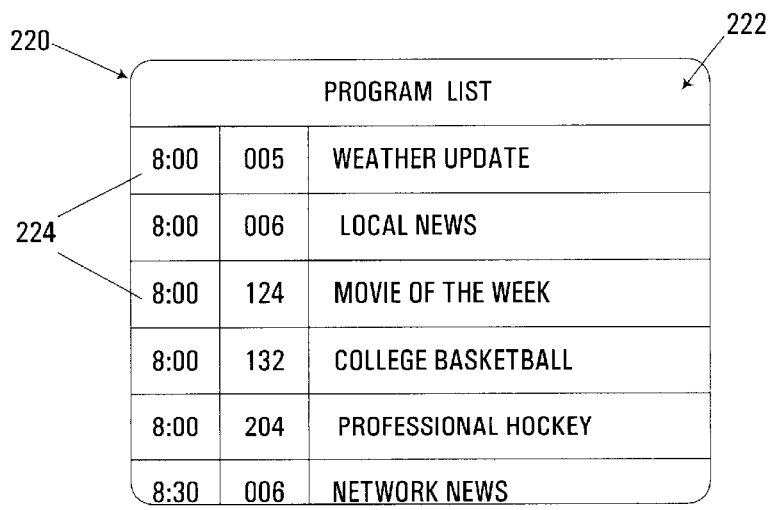
FIG. 11 is a block diagram of a television screen displaying an exemplary program list generated by the view program list routine of FIG. 10.

FIG. 11 illustrates a representative television screen 220 displaying a non-interactive program list 222 including a plurality of entries 224 displaying time slot, channel and program information. In this implementation, the display is scrolled down continuously while the program list is presented to the user. It will be appreciated that the display is essentially continuous whenever the display is active, despite the fact that the display may be closed by a user and no program information displayed thereafter. Given that program list 222 is non-interactive, the scrolling operation will occur repeatedly in the absence of user input. Typically the only user interface with a non-interactive program list is a request to close the list, which may be a separate function, or may be integrated with a channel change function if the program list is associated with a specific channel.

Figure 12:
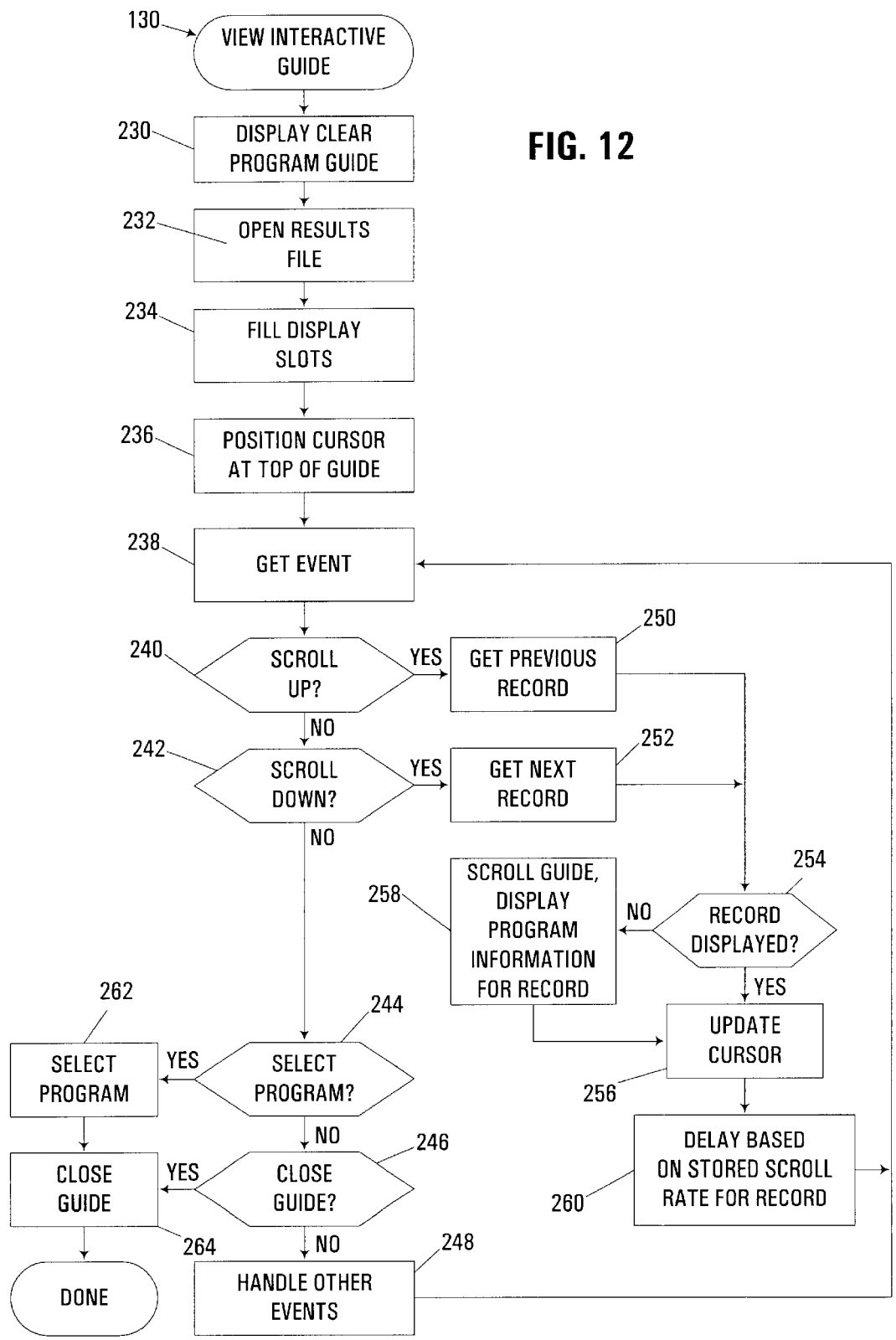
FIG. 12 is a flowchart illustrating the program flow of the view interactive guide routine referenced in FIG. 5.

FIG. 12 illustrates an interactive-type program guide, which is handled by view interactive guide routine 130 of FIG. 12. Routine 130 begins in block 230 by displaying a clear program guide, including open slots and other template information similar to the non-interactive program list. Next, block 132 opens the results file, and block 234 fills the available display slots with initial results file program information. Block 236 then positions a cursor at the top of the guide, in the first display slot therefor. Next, block 238 initiates an event-driven loop which receives and handles events directed to the program guide as appropriate. Several events that relate to dynamic scroll rate adjustment are detected in blocks 240–246. Other events that may be utilized in the interaction of a user with an electronic program guide are handled in a conventional manner in block 248, prior to returning control to block 238.

Blocks 240 and 242 respectively detect scroll up and scroll down events, which are generated in response to user input to move the displayed cursor up or down in the electronic program guide. For a scroll up event, block 240 passes control to block 250 to obtain the previous record in the results file. Likewise, for a scroll down event, block 242 passes control to block 252 to get the next record in the results file. Each of block 250, 252 then passes control to block 254 to determine whether the program information for the new record is currently displayed. If so (indicating, for example, that a user has moved the cursor to another entry that does not require the display of new information on the guide), control passes to block 256 to update the position of the cursor. Returning to block 254, if the record is not already displayed, control instead passes to block 258 to scroll the program guide and display the program information for the new record on the guide at the appropriate location. Control then passes to block 256 to update the position of the cursor. Thus, it may be seen that block 258 will update the display of the program guide to insert the new information for the scrolled-to record. As a component of this function, other slots may need to be shifted in the program guide, and some data discarded as appropriate.

Once the cursor has been updated in block 256, control passes to block 260 to insert a delay based upon the stored scroll rate for the current record. Control then returns to block 238 to process additional events. As such, it may be seen that the stored scroll rate will vary the speed of the cursor as it is moved about the guide.

Another event that may be detected by routine 130 is a select program event, which is detected in block 244 and handled in block 262 by selecting the program currently highlighted by the cursor. Typically, selection of a program will initiate display of the program on the video display, or in the alternative, the display of additional program information associated with the program. Generation of a select program event is typically initiated by depressing an execute or like button on a remoter controller for a front panel while the cursor is displayed over a particular program. Other manners of indicating user selection of a given program displayed on an electronic program guide may be utilized in the alternative.

Once the new program is selected, block 262 passes control to block 264 to close the guide and remove the display therefor from the television screen. Routine 130 is then complete.

Another event that may be handled by routine 130 is that to close the guide without selecting the program. Such an event is detected in block 246 and handled by passing control to block 264 to close the guide without selection or further action with regard to the program highlighted under the cursor.

Figure 13:
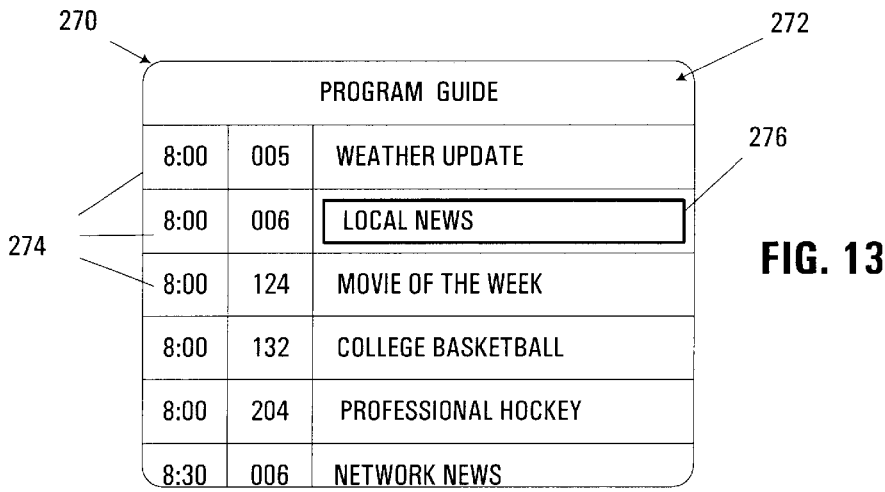
FIG. 13 is a block diagram of a television screen displaying an exemplary interactive program guide generated by the view interactive guide routine of FIG. 12.

FIG. 13 illustrates a representative television screen 270 including an interactive program guide 272 with a plurality of entries 274 listed in a one-dimensional array including both time slot and channel information, as well as additional program information for a given program associated with each entry. Both scrolling up or down through the guide, and selection of given programs or the reception of additional program information is affected through manipulation of a cursor represented at 276. Through appropriate manipulation of the cursor by a user, the user may scroll between currently-displayed program listings, or move the cursor to the top or bottom of the display, resulting in an update to the display to simulate the operation of scrolling through the list.

While guide 272 is illustrated as a one-dimensional guide, in other embodiments, it may be desirable to provide a two-dimensional guide or grid permitting a user to view not only program information for programs on different channels, but also program information for programs displayed on the same channel but in different time slots.

Figure 14:
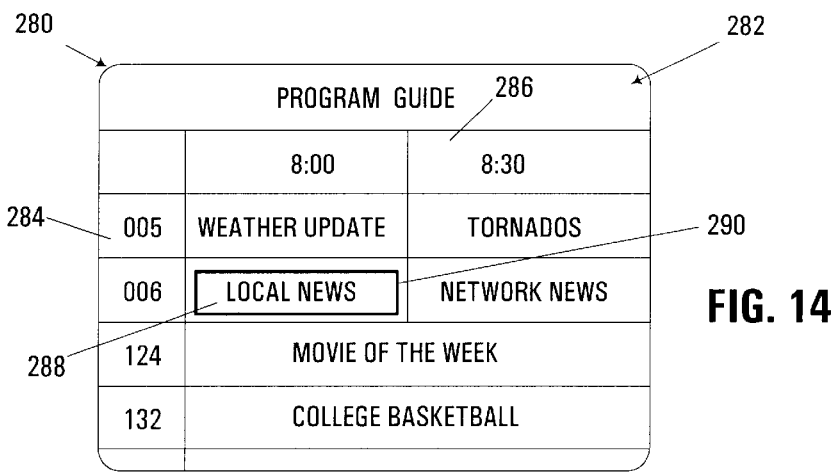
FIG. 14 is a block diagram of a television screen displaying an exemplary two-dimensional interactive program guide capable of being generated by the set top box of FIG. 2.

As shown in FIG. 14, a representative two-dimensional program guide is illustrated in television screen 280 at 282. Along one axis of the grid, channel identifiers 284 are provided, with time slot identifiers displayed along the opposing axis at 286. Program information for programs available at different time slots are represented at 288, and a user-manipulated cursor is illustrated at 290.

Based upon the aforementioned configuration, it will be appreciated that interaction with the guide may also require the ability to move left or right in the guide. Moreover, with different scroll rates associated with each individual program, it will be appreciated that movement of a cursor through the program offerings of a given channel but at different time slots may result in varying scroll rates in this dimension as well. In the alternative, scroll rates may be associated only with channels such that all programs on a given channel will share the same stored scroll rate. In other embodiments, given time slots may be assigned preset scroll rates, such that all programs displayed at a given time slot will share the same scroll rate.

Figure 15:
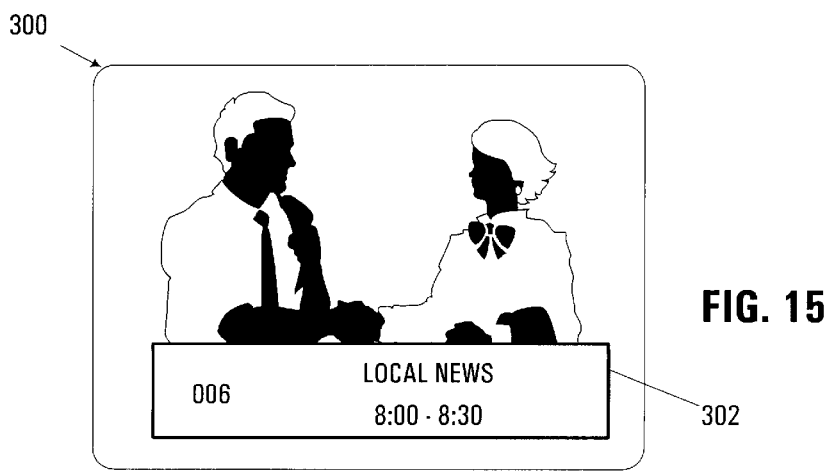
FIG. 15 is a block diagram of a television screen displaying an exemplary overlay capable of being generated by the set top box of FIG. 2.

In addition to varying the scroll rate within an interactive program guide, the scroll rate of a preview function overlay may also be controlled in the manner described above. Specifically, the data generated in the download task may be utilized in controlling the refresh rate that is used to update an overlay when a user is scrolling through program information independent of any electronic program guide. As shown in FIG. 15, for example, a television screen 300 may have an overlay 302 displayed thereon, displaying detailed program information for a single channel. Through user manipulation (e.g., via depression of menu or arrow keys on a remote control), a user may be permitted to view program information for programs on different channels and/or during different time slots. The rate at which the user is capable of scrolling between the program information for different programs can be controlled using the scroll rate information stored by the download task if desired.

Thus, it may be seen that, when used in combination with monitored viewing habits of a user, the display of program information to a user may be controlled such that programs watched more frequently are scrolled through at a relatively slower rate than programs that are seldom watched. Thus, the overall access time to retrieve useful program information is typically lowered.

Various modifications may be made to the illustrated embodiments without departing from the spirit and scope of the invention. For example, it may not be desirable to restrict the program information to only favorite channels. Instead, it may be desirable to include all of the available programs reordered based upon previous viewing habits, and with programs that have not been viewed in the past simply demoted to the end of the order. A favorites list may also be a fixed length, with non-favorite programs simply listed in numerical order following the favorites list.

In addition, rather than automatically generating favorite programs, the generation of a list of favorite programs may be initiated through separate user action, e.g., a "favorites" button. Moreover, as discussed above, rather than associating stored scrolled information with individual programs, such scroll rate information may be associated on a channel-by-channel basis or a time slot-by-time slot basis. Moreover, it may not be desirable to reorder channels at all, whereby the movement of a cursor or the scroll through program listings would simply vary based upon scroll rate, with the programs listed in numerical and/or chronological order.

Monitoring of user viewing habits may also be based on a channel-by-channel basis, storing favorite channels rather than individual programs.

Additional modifications may be made to the illustrated embodiments without departing from the spirit or scope of the invention. Therefore, the invention lies in the claims hereinafter appended.

What is claimed is:

1. A method of displaying television program information, the method comprising:
   (a) displaying program information for a first television program from a plurality of television programs on a display;
   (b) scrolling the display to display program information for a second television program from the plurality of television programs; and
   (c) dynamically adjusting a scroll rate at which the display is scrolled based upon a predetermined characteristic of the first television program.

2. The method of claim 1, further comprising displaying at least a first portion of a list of program information for at least a portion of the plurality of television programs, and wherein scrolling the display includes scrolling through the list of program information to display a second portion of the list.

3. The method of claim 2, wherein the list includes program information for television programs on multiple channels and shown at multiple time slots, with the program information therefor arranged into a two-dimensional array.

4. The method of claim 2, wherein scrolling the display is performed continuously.

5. The method of claim 2, wherein scrolling the display is performed responsive to user input.

6. The method of claim 5, wherein scrolling the display includes moving a user-manipulated cursor from the displayed program information for the first television program to that of the second television program, and wherein dynamically adjusting the scroll rate at which the display is scrolled includes controlling a delay before moving the user-manipulated cursor from the displayed program information for the first television program to that of the second television program.

7. The method of claim 1, wherein displaying the program information for the first television program includes displaying only the program information for the first television program in an overlay, wherein scrolling the display includes updating the overlay to display only the program information associated with the second television program, and wherein dynamically adjusting the scroll rate at which the display is scrolled includes controlling a delay before updating the overlay to display the program information associated with the second television program.

8. The method of claim 1, wherein each of the plurality of television programs is associated with a stored scroll rate, and wherein dynamically adjusting the scroll rate at which the display is scrolled includes setting the scroll rate based upon the stored scroll rate for the first television program.

9. The method of claim 1, wherein dynamically adjusting the scroll rate is based upon sponsorship information associated with the first television program.

10. The method of claim 1, further comprising monitoring viewing habits of a user, wherein dynamically adjusting a scroll rate at which the display is scrolled is based upon the monitored viewing habits.

11. The method of claim 10, wherein monitoring the viewing habits of the user includes accumulating the number of times television programs are viewed in excess of a predetermined threshold.

12. The method of claim 10, wherein monitoring the viewing habits of the user further includes generating a list of favorite television programs from the plurality of television programs based upon the viewing habits of the user, the method further comprising displaying the program information for at least a portion of the list of favorite television programs.

13. The method of claim 12, wherein monitoring the viewing habits of the user further includes sorting the list of favorite television programs based upon frequency of access.

14. The method of claim 13, wherein monitoring the viewing habits of the user further includes sorting the list of favorite television programs by timeslot, wherein sorting the list of favorite television programs based upon frequency of access includes sorting favorite television programs viewed in the same timeslot based upon frequency of access.

15. A method of displaying television program information, the method comprising:
   (a) monitoring user viewing habits;
   (b) scrolling through displayed program information associated with a plurality of television programs; and
   (c) dynamically adjusting a scroll rate used when scrolling through the displayed program information associated with the plurality of television programs based upon the user viewing habits.

16. The method of claim 15, wherein scrolling through the displayed program information associated with the plurality of television programs includes continuously scrolling through a list of program information.

17. The method of claim 15, wherein scrolling through the displayed program information associated with the plurality of television programs is performed in response to user input, the method further comprising selecting a selected television program among the plurality of television programs in response to user input directed to the displayed program information.

18. A method of displaying television program information, the method comprising:

(a) continuously scrolling through a list of program information for a plurality of television programs;

(b) dynamically adjusting a scroll rate used when continuously scrolling through the list of program information; and (c) monitoring user viewing habits to determine that a first television program has a higher frequency of access than a second television program, and wherein dynamically adjusting the scroll rate is performed in response to the user viewing habits such that the scroll rate is slower when scrolling through the program information associated with the first television program relative to the scroll rate when scrolling through the program information associated with the second television program.

19. A method of displaying television program information, the method comprising:

(a) continuously scrolling through a list of program information for a plurality of television programs;

(b) dynamically adjusting a scroll rate used when continuously scrolling through the list of program information; and (c) receiving sponsorship information indicating that a first television program is a sponsored program and that a second television program is not a sponsored program, and wherein dynamically adjusting the scroll rate is performed in response to the sponsorship information such that the scroll rate is slower when scrolling through the program information associated with the first television program relative to the scroll rate when scrolling through the program information associated with the second television program.

20. An apparatus, comprising:

(a) a memory; and (b) a program resident in the memory, the program configured to display program information for a first television program from a plurality of television programs on a display, scroll the display to display program information for a second television program from the plurality of television programs, and dynamically adjust a scroll rate at which the display is scrolled based upon a predetermined characteristic of the first television program.

21. The apparatus of claim 20, wherein the program is further configured to display at least a first portion of a list of program information for at least a portion of the plurality of television programs, and to scroll the display by scrolling through the list of program information to display a second portion of the list.

22. The apparatus of claim 20, wherein each of the plurality of television programs is associated with a stored scroll rate, and wherein the program is configured to dynamically adjust the scroll rate at which the display is scrolled by setting the scroll rate based upon the stored scroll rate for the first television program.

23. The apparatus of claim 20, wherein the program is configure to dynamically adjust the scroll rate based upon sponsorship information associated with the first television program.

24. The apparatus of claim 20, wherein the program is further configured to monitor viewing habits of a user, and to dynamically adjust the scroll rate at which the display is scrolled based upon the monitored viewing habits.

25. The apparatus of claim 24, wherein the program is configured to monitor the viewing habits of the user by generating a list of favorite television programs from the plurality of television programs based upon the viewing habits of the user.

26. A program product, comprising:

(a) a program configured to display program information for a first television program from a plurality of television programs on a display, scroll the display to display program information for a second television program from the plurality of television programs, and dynamically adjust a scroll rate at which the display is scrolled based upon a predetermined characteristic of the first television program; and (b) a signal bearing medium bearing the program.

27. The program product of claim 26, wherein the signal bearing medium includes at least one of a transmission medium and a recordable medium.

\* \* \* \* \*